United States Patent [19]
Sensui et al.

[11] Patent Number: 5,420,438
[45] Date of Patent: May 30, 1995

[54] FOCUS DETECTING APPARATUS INCLUDING MOVEMENT OF DETECTING ZONES

[75] Inventors: Takayuki Sensui; Tatsuhide Takebayashi, both of Tokyo, Japan

[73] Assignee: Asahi Kogaku Kogyo Kabushiki Kaisha, Tokyo, Japan

[21] Appl. No.: 142,071

[22] Filed: Oct. 28, 1993

[30] Foreign Application Priority Data

Oct. 29, 1992 [JP] Japan .................................. 4-291114

[51] Int. Cl.6 .................................................. G01J 1/20
[52] U.S. Cl. ................................... 250/201.8; 250/204; 356/363; 354/404
[58] Field of Search .................. 250/208.1, 204, 201.7, 250/201.8, 201.2; 354/404, 403, 406, 407, 408; 356/363, 401, 400

[56] References Cited

U.S. PATENT DOCUMENTS

| | | | |
|---|---|---|---|
| 3,953,729 | 4/1976 | Hosoe et al. | 250/204 |
| 4,636,624 | 1/1987 | Ishida et al. | 250/204 |
| 4,857,720 | 8/1989 | Karasaki | 354/408 |
| 4,900,911 | 2/1990 | Matsui et al. | 250/204 |
| 4,901,102 | 2/1990 | Karasaki et al. | 354/408 |
| 5,005,087 | 4/1991 | Suzuki et al. | 354/402 |
| 5,017,005 | 5/1991 | Shindo | 250/201.2 |
| 5,168,298 | 12/1992 | Hirai | 354/402 |
| 5,206,498 | 4/1993 | Sensui | 354/407 |
| 5,241,168 | 8/1993 | Sensui | 250/208.1 |

Primary Examiner—David C. Nelms
Attorney, Agent, or Firm—Sandler Greenblum & Bernstein

[57] ABSTRACT

A focus detecting apparatus is provided including an image reforming optical system which splits a bundle of rays incident upon a detecting zone, which is provided on a predetermined focal surface, and reforms an image. The predetermined focal surface is substantially conjugate with a focal plane of a taking lens. The focus detecting apparatus further includes a line sensor which receives the reformed image, a detector which detects a focus state of the taking lens in accordance with an output of the line sensor, and a driver which moves the detecting zone on the predetermined focal surface.

23 Claims, 7 Drawing Sheets

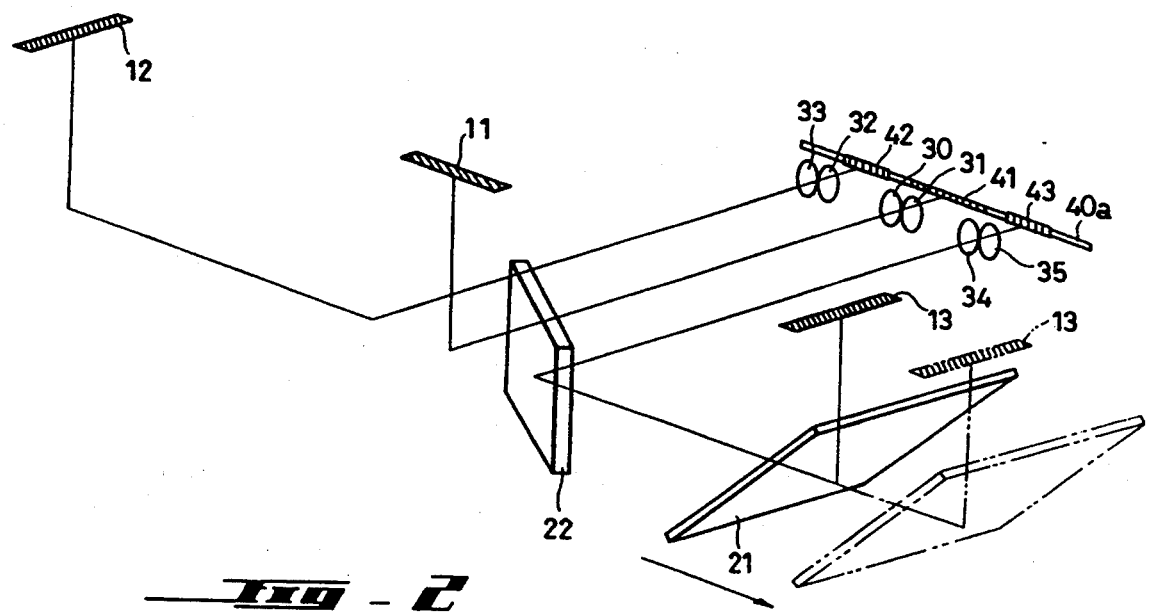
_Fig-2_
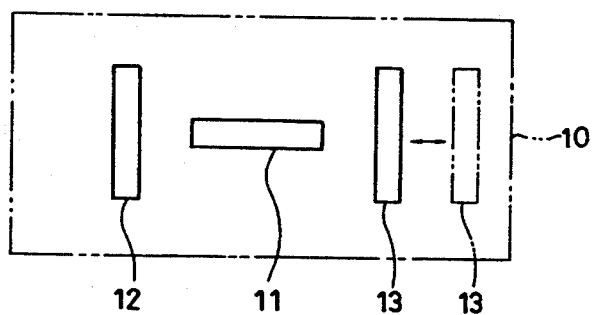
_Fig-3_
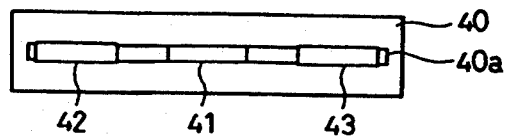
_Fig-4_

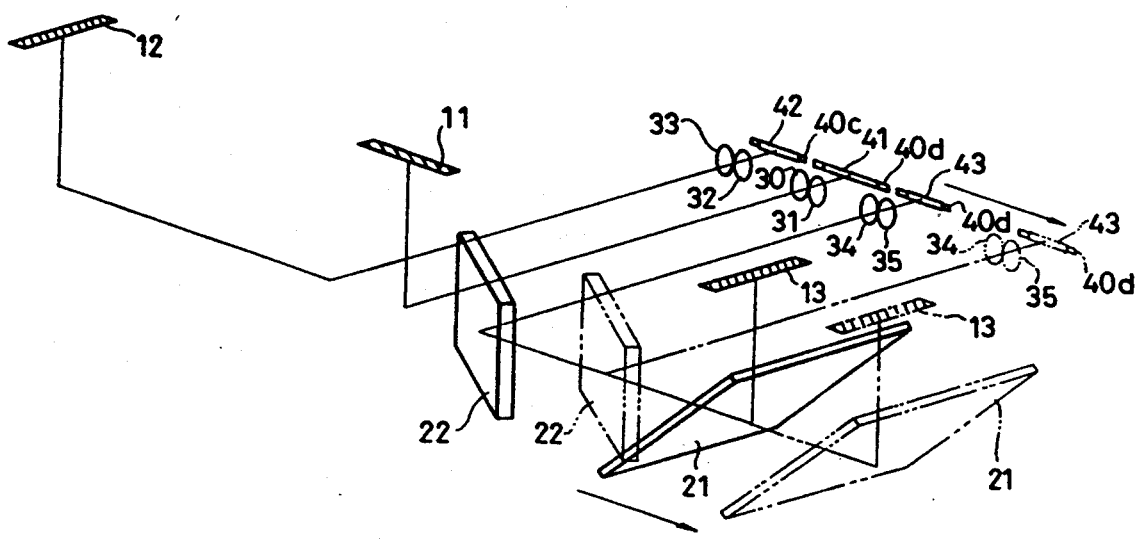
_Fig - 10_
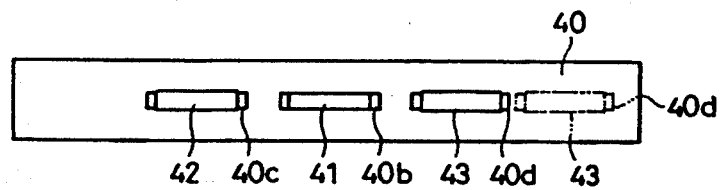
_Fig - 11_

FOCUS DETECTING APPARATUS INCLUDING MOVEMENT OF DETECTING ZONES

BACKGROUND OF THE INVENTION

1. Field of the Invention

The present invention relates to a focus detecting apparatus for detecting a focus state of a taking (or photographing) lens of, for example, a camera, with respect to an object to be photographed.

2. Description of Related Art

In a known focus detecting apparatus of a single lens reflex camera or the like, bundles of rays transmitted through different portions of an exit pupil of a taking lens are converged onto a pair of line sensors by an image reforming lens of a focus detecting optical system, so that the focus state of the taking lens can be detected in accordance with a relationship between outputs of the line sensors. The principle of focus detection by the focus detecting apparatus is disclosed, for example, in U.S. Pat. No. 4,636,624. A known apparatus for detecting the focus state of a taking lens with respect to an object located at a position other than the center of an image plane has been disclosed in which a detecting area of the focus detecting apparatus is deviated from the optical axis. However, as the distance of the off-axis detecting area from the optical axis increases, vignetting of the focus detecting optical system pupil occurs when the position or size of the exit pupil of the taking lens changes as a result of a lens change (e.g., when using an interchangeable lens) or during a zooming operation. In such cases, the area of the focus detecting optical system pupil, through which the bundle of rays is transmitted, is reduced. As a result, the applicability of such an automatic focus detecting system to an interchangeable lens is restricted. It is also possible that the automatic focus detecting system will not work at a specific focal length within a zooming range.

To solve these problems, an application, commonly assigned with the present application, has been filed under the serial number of U.S. Ser. No. 07/885,369. According to this application, a focus detecting apparatus is provided in which a pair of bundles of rays transmitted through different portions of an exit pupil of a taking lens are transmitted through a common AF detecting zone formed on an imaginary focal plane of the taking lens, so that images of the bundles of rays are formed at predetermined positions. The focus detecting apparatus includes at least two image reforming optical systems which reform images of the bundles of rays incident on the AF detecting zone from different directions, in accordance with a change in position of the exit pupil in an optical axis direction of the taking lens. The apparatus further includes at least one pair of line sensors located at the predetermined positions, so that the images of the bundles of rays are reformed on the respective line sensors through the respective image reforming optical systems.

SUMMARY OF THE INVENTION

It is an object of the present invention to provide a focus detecting apparatus in which focus data of objects having various heights can be easily obtained.

Namely, the present invention is directed to an adjustable (i.e., movable) AF detecting zone in which the AF data of objects having different heights can be easily and correctly detected, unlike the conventional focus detecting apparatus.

To achieve the object mentioned above, according to the present invention, a focus detecting apparatus is provided having an image reforming optical system which splits a bundle of rays incident upon a AF detecting zone, provided on a predetermined focal surface which is substantially conjugate with a focal plane of a taking lens to reform an image. A light receiving member for receiving the reformed image, a detecting member for detecting a focus state of the taking lens in accordance with an output of the light receiving member, and a mechanism for moving the AF detecting zone on the predetermined focal surface are also provided.

Preferably, the AF detecting zone includes a center detecting zone and movable peripheral detecting zones.

In a preferred embodiment, the peripheral detecting zones extend in a sagittal direction of the taking lens.

The light receiving member can be formed as a line sensor.

Provision is also made for a deflecting device between the detecting zone and the line sensor for deflecting the bundles of rays transmitted through the center detecting zone and the peripheral detecting zones to be made incident upon the line sensor.

The AF detecting zone moving mechanism can be provided with a mechanism which moves the peripheral detecting zones and an auxiliary mechanism for moving the deflecting member in accordance with the movement of the peripheral detecting zones.

Preferably, the deflecting device includes a first deflecting mirror which reflects the bundles of rays transmitted through the peripheral detecting zones and a second deflecting mirror which reflects the bundle of rays reflected by the first deflecting mirror towards the image reforming optical system.

The detecting zone moving mechanism moves the peripheral detecting zones, the first deflecting mirror and/or the image reforming optical system together.

An optical path length correcting mechanism is also provided and maintains constant the optical path length between the detecting zone and the light receiving member when the peripheral detecting zones are moved by the moving mechanism.

Preferably, the light receiving member includes a line sensor, so that when the peripheral detecting zones and/or the image reforming optical system are moved by the moving mechanism, the point on the line sensor, at which the bundle of rays is made incident, changes.

According to another aspect of the present invention, a focus detecting apparatus includes a center detecting zone and peripheral detecting zones provided on a predetermined focal surface which is substantially conjugate with a focal plane of a taking lens. The peripheral zones are elongated in a sagittal direction of the taking lens. An image reforming optical system which splits bundles of rays transmitted through the center detecting zone and the peripheral detecting zones to reform an image is also provided linear light receiving member for receiving the reformed image, a detecting member for detecting a focus state of the taking lens in accordance with an output of the light receiving member, and a deflecting device for deflecting the bundles of rays transmitted through the center detecting zone and the peripheral detecting zones and made incident upon the light receiving member are also provided.

Preferably, the deflecting device includes a first deflecting mechanism for the center detecting zone that includes a deflecting mirror which reflects the bundle of rays transmitted through the center detecting zone, and a second deflecting mechanism for the peripheral detecting zones that includes of first deflecting mirrors that reflect the bundles of rays transmitted through the peripheral detecting zones and second deflecting mirrors which reflect the bundles of rays reflected by the first deflecting mirrors towards the light receiving members.

According to still another aspect of the present invention, there is provided a focus detecting apparatus having a center detecting zone and peripheral detecting zones provided on a predetermined focal surface which is substantially conjugate with a focal plane of a taking lens. A detecting zone moving mechanism for moving the peripheral detecting zones with respect to the center detecting zone, an image reforming optical system which splits bundles of rays transmitted through the center detecting zone and the peripheral detecting zones to reform an image, a linear light receiving member for receiving the reformed image, and a detecting member for detecting a focus state of the taking lens in accordance with an output of the light receiving means are also provided.

The present disclosure relates to subject matter contained in Japanese Patent Application No. HEI 4-291114 (filed on Oct. 29, 1992) which is expressly incorporated herein by reference in its entirety.

BRIEF DESCRIPTION OF THE DRAWINGS

The invention will be described below in detail with reference to the accompanying drawings, in which;

FIG. 2 is a perspective view of main components of a focus detecting apparatus shown in FIG. 1;

FIG. 3 is a plan view of a geometrical arrangement of AF detecting zones formed on a focal surface in a focus detecting apparatus shown in FIG. 1;

FIG. 9 is a schematic view of optical elements in a modified focus detecting apparatus according to the present invention;

FIG. 10 is a conceptual perspective view of a second embodiment of a focus detecting apparatus according to the present invention;

FIG. 11 is a plan view of a geometrical arrangement of line sensors provided on an image reforming surface in a focus detecting apparatus shown in FIG. 10;

DESCRIPTION OF THE PREFERRED EMBODIMENT

The preferred embodiments of the present invention which will be discussed below are applied to a focus detecting apparatus, for example, for a single lens reflex camera to detect a focus state of a taking lens with respect to a plurality of objects to be photographed within a picture taking area.

FIGS. 1 through 4 show a first embodiment of a focus detecting apparatus according to the present invention.

Figure 1:
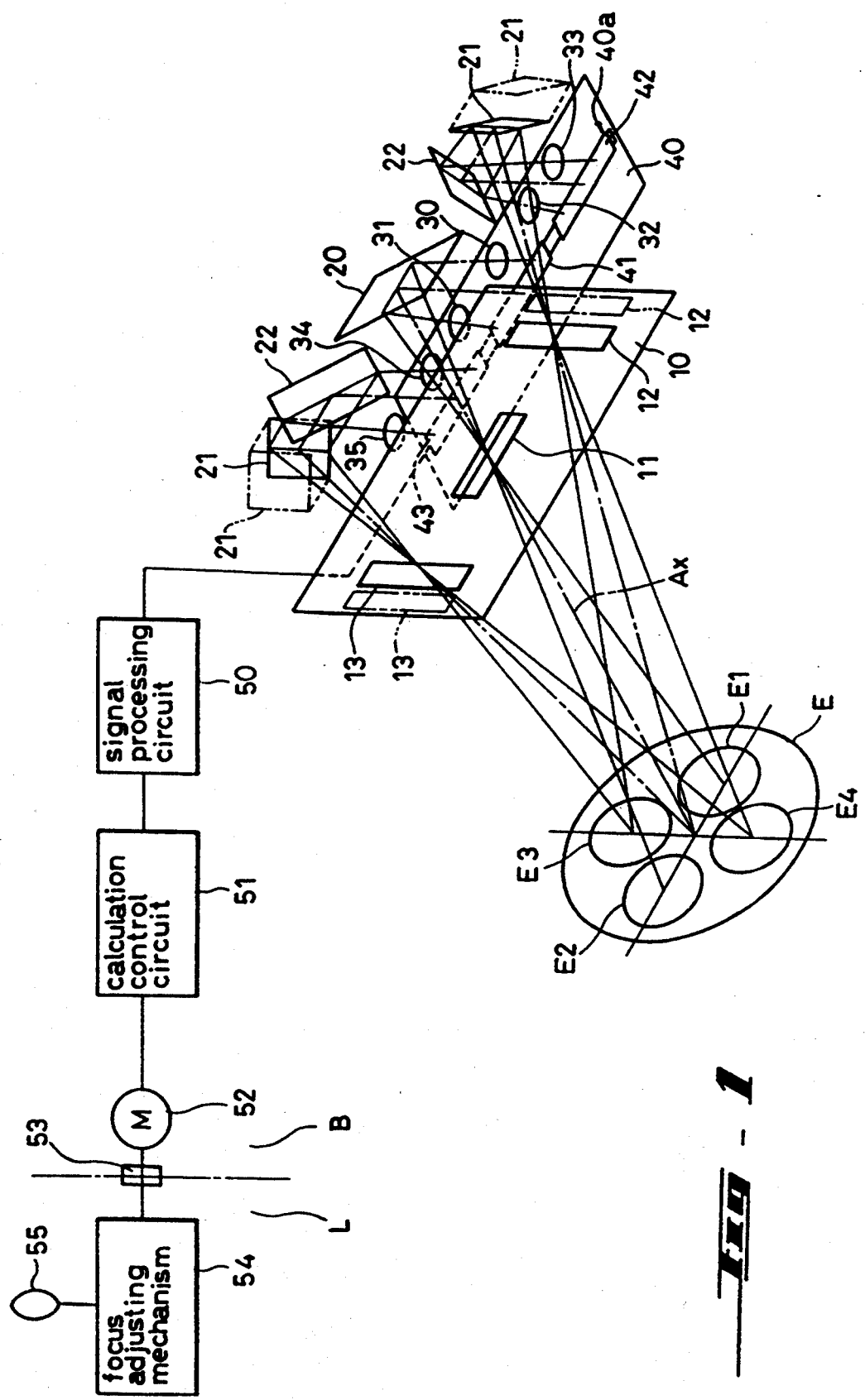
FIG. 1 is a conceptual perspective view of a first embodiment of a focus detecting apparatus according to the present invention.

In FIGS. 1 and 2, there are three openings which define three AF detecting zones 11, 12 and 13 in the vicinity of a predetermined focal surface 10 on which an image is to be formed by a taking lens in order to determine the field of view of a focus detecting optical system. One intermediate AF detecting zone 11 is fixed. Two peripheral AF detecting zones 12 and 13 are movable or adjustable.

The focal surface 10 is optically conjugate with a film plane in a photographic camera or an image sensor in an electronic camera, respectively. Moreover, in a camera having a view finder through which an object image formed on a focusing plate can be viewed, the focal surface 10 is optically conjugate with the focusing plate.

As mentioned above, the focus detecting zones include the elongated intermediate or center detecting zone 11, which intersects the optical path of the taking lens, and the peripheral detecting zones 12 and 13 that are located on opposite sides of the intermediate detecting zone 11 and oriented orthogonally with respect to the intermediate detecting zone 11. The elongated peripheral detecting zones 12 and 13 are movable in the lengthwise direction of the intermediate detecting zone 11. The peripheral detecting zones 12 and 13 are movable between a first position in which the peripheral detecting zones 12 and 13 are located close to the intermediate detecting zone 11, as indicated at the solid lines in FIG. 1, and a second position in which the peripheral detecting zones 12 and 13 are located away from the intermediate detecting zone 11, as indicated at phantom lines 12' and 13'. The movement of the mirrors will be discussed hereinafter.

Bundles of rays transmitted through two split sections E1 and E2 of an exit pupil E of the taking lens, that are spaced in the horizontal direction and made incident upon the intermediate detecting zone 11, are deflected by 90° by a first mirror 20 and then split by a pair of separator lenses 30 and 31, which constitute an image reforming optical system, and converged (reformed) onto a center area 41 of a line sensor 40a as a light receiving means provided on an image reforming surface 40. The separator lenses 30 and 31 split the image formed on the intermediate detecting zone 11 into two images to be reformed, respectively. The pupils of the separator lenses 30 and 31 are optically conjugate with the exit pupil E of the taking lens as a pupil of the focus detecting optical system.

Bundles of rays transmitted through two split sections E3 and E4 of the exit pupil E of the taking lens, that are spaced in the vertical direction, are made incident upon the peripheral detecting zones 12 and 13, deflected 90° by second and third mirrors 21 and 22, respectively, and are converged (i.e., formed ) onto peripheral areas 42 and 43 of the line sensor 40a through two pairs of separator lenses 32, 33 and 34, 35, respectively.

The three areas 41, 42 and 43 of the line sensor 40a are located so that the associated object images are formed thereon by the respective image reforming optical systems. Namely, a pair of split and reformed images are received on the areas 41, 42 and 43 of the line sensor 40a. The finder optical system includes a focusing area which enables a photographer to confirm AF detecting zones corresponding to the focus detecting zones on the predetermined focal surface.

Namely, the output of the line sensor 40a is input to a signal processing circuit 50 and a calculation controlling circuit 51 which calculates the positional relationship of the split images to thereby detect the amount of defocus of the object, based on the output of the line sensor 40a. The calculation controlling circuit 51 drives a control motor 52 provided in a camera body B, based on the calculation results, and actuates a focus adjusting mechanism 54 of the taking lens L through a drive coupling 53 to thereby move a focus adjusting lens 55 in the optical axis direction. The outputs of the sections 41, 42 and 43 of the line sensor 40a to be selected are determined in accordance with the pre-selection of the detecting zones 11, 12 and 13.

A focus detecting circuit (not shown) detects the focus state of the taking lens in accordance with the output of the line sensor corresponding to the focusing area of an object image.

The rightmost and leftmost detecting zones 12 and 13 on the field mask (i.e., focal surface) 10 are movable in the lateral directions (i.e., left and right directions) with respect to the intermediate detecting zone 11 while maintaining the orthogonal relationship thereto. In the orthogonal arrangement of the intermediate detecting zone 11 and the peripheral detecting zones 12 and 13, the bundle of rays transmitted therethrough are deflected by the first, second and third mirrors 20, 21 and 22, so that the bundles of rays can be converged onto the areas 41, 42 and 43 of the single linearly extending line sensor 40a on the image reforming surface 40.

In the illustrated embodiment, when movement of the peripheral detecting zones 12 and 13 occurs, the second and third mirrors 21 and 22 are moved together with the peripheral detecting zones 12 and 13 to receive the bundle of rays at different areas of the line sensor 40a. The peripheral detecting zones 12 and 13 are elongated in the sagittal direction normal to the longitudinal direction of the intermediate detecting zone 11. Due to the above-mentioned orientation of the peripheral detecting zones 12 and 13 with respect to the intermediate detecting zone 11, little or no vignetting occurs, since the exit pupil of the taking lens is circular. Conversely, if the longitudinal direction of the peripheral detecting zones 12 and 13 was identical to the longitudinal direction of the center detecting zone 11, vignetting would occur particularly at an upper portion of the object image. Accordingly, focus detection could not be executed due to a shortage of light.

Figure 5:
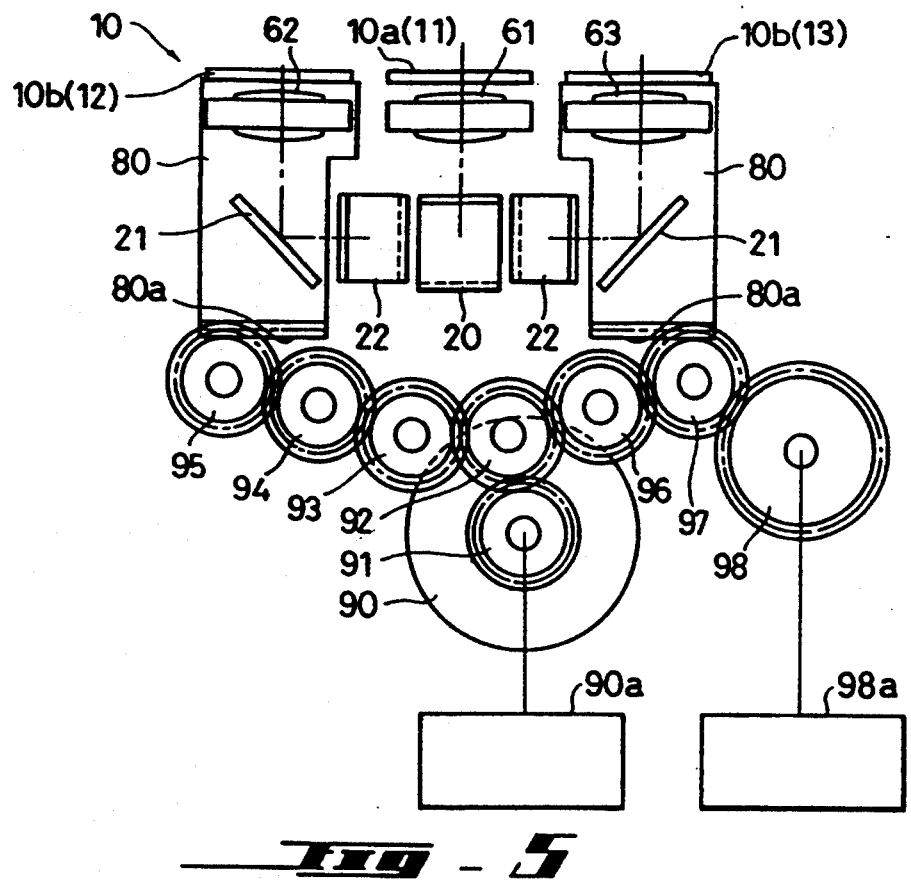
FIG. 5 is a front elevational view of a drive mechanism of a focus detecting apparatus, shown in a first position in which peripheral detecting zones are located in an inner position.
Figure 6:
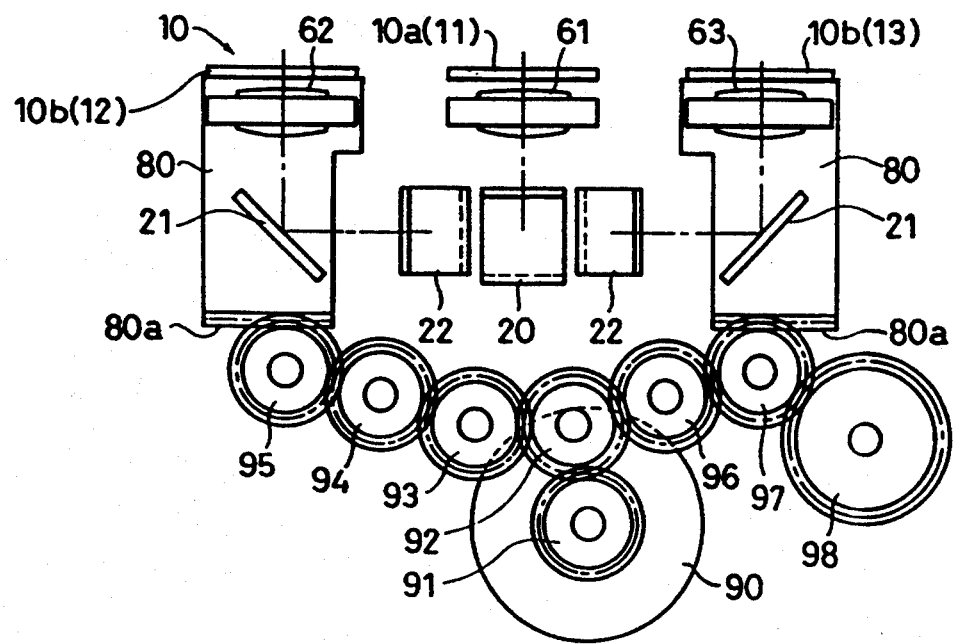
FIG. 6 is a front elevational view of a drive mechanism of a focus detecting apparatus, shown in a second position in which peripheral detecting zones are located in an outer position.
Figure 7:
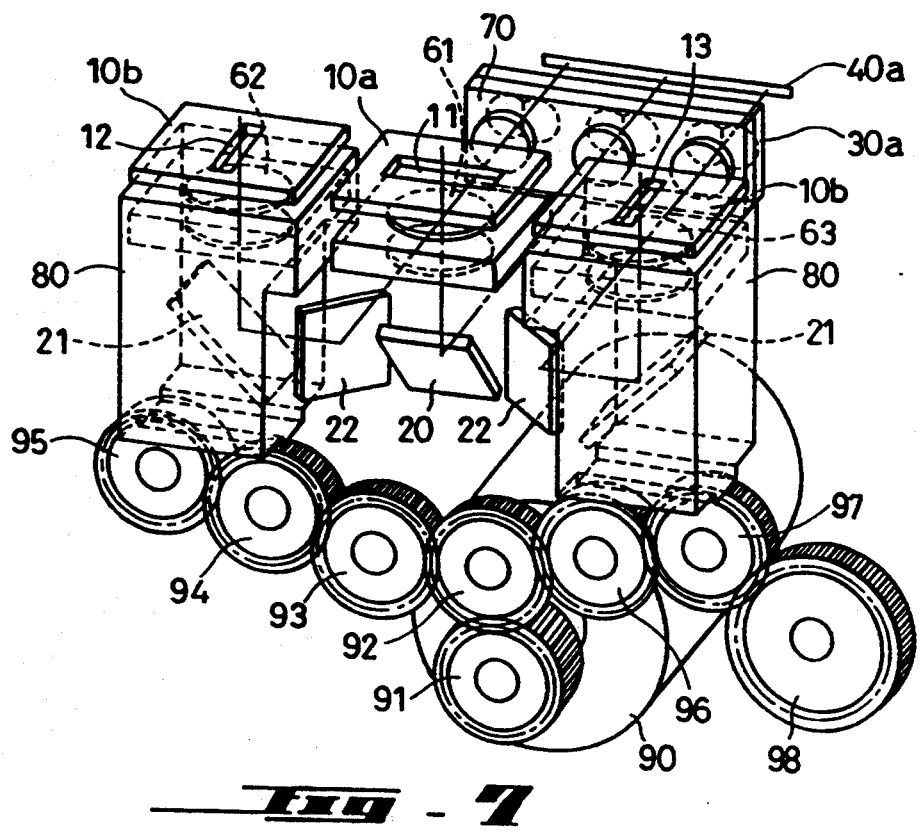
FIG. 7 is a perspective view of a drive mechanism shown in FIG. 5.
Figure 8:
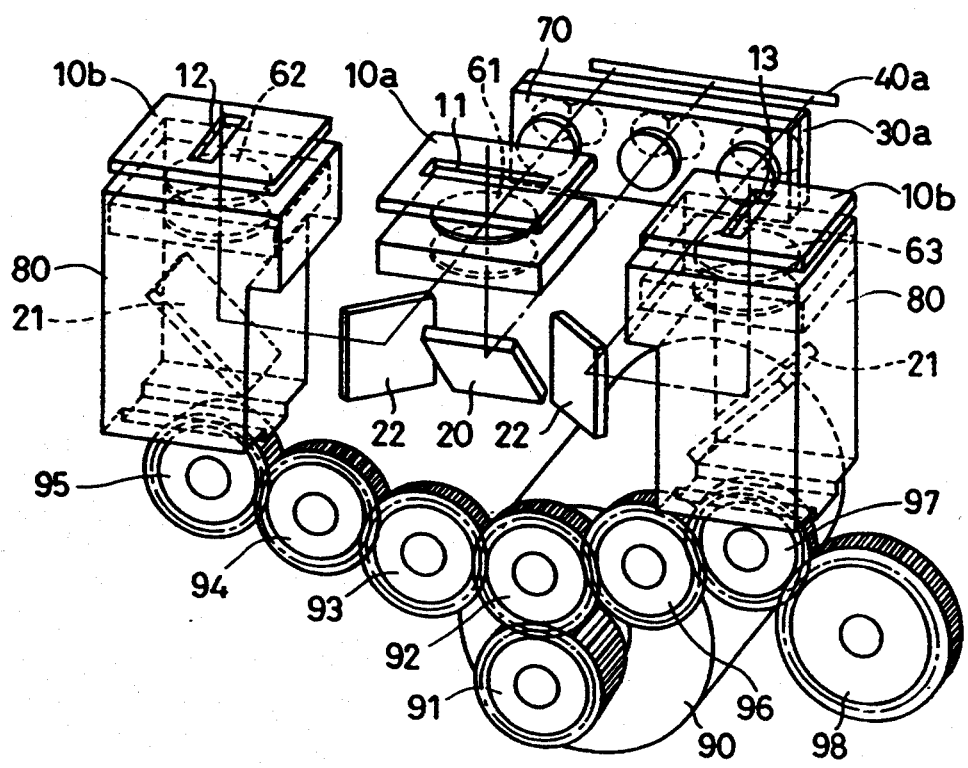
FIG. 8 is a perspective view of a drive mechanism shown in FIG. 6.
Figure 4:
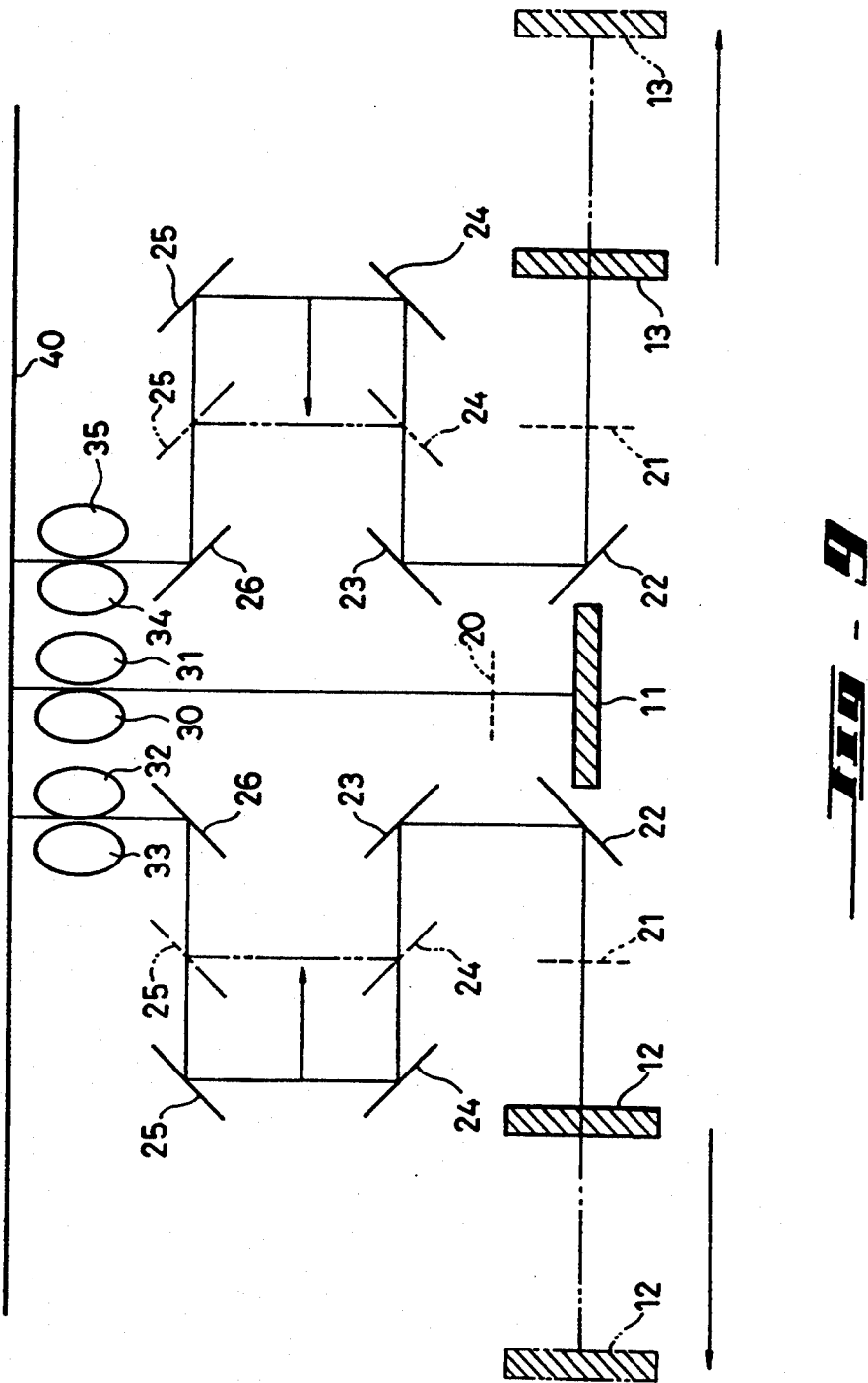
FIG. 4 is a plan view of a geometrical arrangement of line sensors provided on an image reforming surface in a focus detecting apparatus shown in FIG. 1.

FIGS. 5 through 8 show a drive mechanism for moving the peripheral detecting zones 12 and 13, and the second and third mirrors 21 and 22. FIGS. 5 and 7 show the first position of the peripheral detecting zones 12 and 13 in which the latter are moved towards the center detecting zone 11. FIGS. 6 and 8 show the second position of the peripheral detecting zones 12 and 13 in which the latter are moved away from the center detecting zone 11, respectively.

An immovable zone plate 10a is provided with the intermediate detecting zone 11, and a pair of movable zone plates 10b are provided with the peripheral detecting zones 12 and 13. The movable zone plates 10b are located on opposite sides of the immovable zone plate 10a in a partly overlapping fashion.

The bundles of rays transmitted through the detecting zones 11, 12 and 13 are transmitted through corresponding condenser lenses 61, 62 and 63 and are then reflected by the respective mirrors 20, 21 and 22. Thereafter, the reflected bundles of rays are transmitted through a separator lens assembly 30a including an auxiliary lens group 70 and separator lenses and are then converged onto the line sensors 40a.

The condenser lens 62 together with the corresponding mirror 21, and the condenser lens 63 together with the corresponding mirror 21 are provided in respective carriages 80 which are slidable in the longitudinal direction of the focal plane 10. The movable zone plates 10b are secured to the respective carriages 80. The carriages 80 are moved by a motor 90 through gear trains consisting of gears 91, 92, 93, 94 and 95, and gears 91, 92, 96 and 97, while maintaining a symmetrical arrangement of the movable zone plates 10b. The carriages 80 are provided on the lower sides (in FIGS. 5 through 8) thereof with racks 80a which are in mesh with the terminal gears 95 and 97 of the respective identical gear trains, so that the drive force of the motor 90 can be transmitted to the movable zone plates 10b.

A motor control circuit 90a (FIG. 5) controls the drive of the motor 90 in a closed loop, in accordance with the angular displacement of the terminal gears 95 and 97 (and accordingly the linear displacement of the carriages 80) detected by a rotation detecting circuit 98a connected to a gear 98 which is in mesh with the terminal gear 97 of the gear train. The identical carriages 80 are equally driven by the common drive motor 90 through the respective gear trains.

With this arrangement, when the carriages 80 are driven by the drive motor 90, the peripheral detecting zones 12 and 13 are moved. Hence, the image height thereof, i.e., the distance of the peripheral detecting zones 12 and 13 from the intermediate detecting zone 11 can be adjusted. Consequently, when the peripheral detecting zones 12 and 13 are moved, for example, in association with the focal length of the taking lens, the identical object can be detected by the respective detecting zones before and after zooming is completed.

In the illustrated embodiment, since the movement of the mirrors 21 causes the optical path length between the peripheral detecting zones 12, 13 and the line sensor 40a to change, it is necessary to increase the focal depth of the image reforming optical system or vary the focal length of the associated lens in accordance with the movement of the mirrors in order to maintain the conjugate relationship.

FIG. 9 shows a modified embodiment in which provision is made of an optical path adjuster to cancel the change in the optical path length caused by the movement of the peripheral detecting zones 12 and 13. In FIG. 9, the bundles of rays transmitted through the peripheral detecting zones 12 and 13 are reflected by the respective mirrors 21 and 22 and are then made incident upon the separator lenses 32, 33, 34 and 35 through the four mirrors 23, 24, 25 and 26, which are located at four corners of an imaginary rectangle, and converged onto the image reforming surface 40.

The mirrors 24 and 25 are movable in a direction parallel to the mirrors 23 and 26 towards and away from the mirrors 23 and 26, while maintaining a constant distance between the mirrors 24 and 25. Consequently, the change in optical path length caused by the movement of the mirrors 21 can be cancelled by the change in optical path length caused by the movement of mirrors 24 and 25. With this arrangement, no change in optical path length occurs when the peripheral detecting zones 12 and 13 are moved. Accordingly, the focus state can be correctly detected without changing the focal length of the lens, even if the focal depth of the optical system of the focus detecting apparatus is small.

FIG. 10 shows a second embodiment of a focus detecting apparatus according to the present invention. In FIG. 10, the mirrors 21 and 22, and the separator lenses 32, 33, 34 and 35 are moved together in accordance with the change in positions of the peripheral detecting zones 12 and 13. Furthermore, there are three line sensors 40b, 40c and 40d on the image reforming surface 40, as can be seen in FIG. 11. The line sensors 40c and 40d, which are adapted to receive the bundles of rays transmitted through the peripheral detecting zones, are mechanically moved in the longitudinal direction thereof in accordance with the movement of the mirrors, etc. Namely, the line sensors 40c and 40d are movable in accordance with the movement of the peripheral detecting zones 12 and 13.

For instance, when the peripheral detecting zone 13 is located in the first position (i.e., inner position) close to the intermediate detecting zone 11, as indicated by a solid line, the mirrors 21 and 22, the separator lenses 34 and 35, and the line sensor 40d are located in the first position indicated by solid lines. If the peripheral detecting zone 13 is moved to the second position (i.e., outer position) away from the intermediate detecting zone 11, as indicated by a phantom line 13', the mirrors 21 and 22, the separator lenses 34 and 35, and the line sensor 40d are moved to the second position indicated by phantom lines 21', 22', 34', 35' and 40d', respectively.

Figure 12:
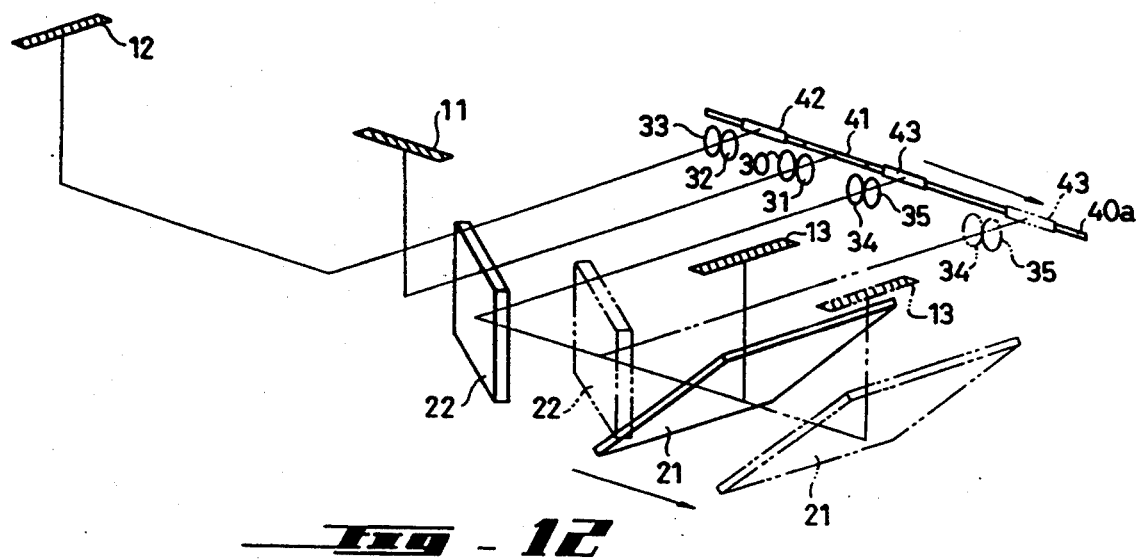
FIG. 12 is a conceptual perspective view of a third embodiment of a focus detecting apparatus according to the present invention; and, FIG. 13 is a plan view of a geometrical arrangement of a line sensor provided on an image reforming surface in a focus detecting apparatus shown in FIG. 12.
Figure 13:
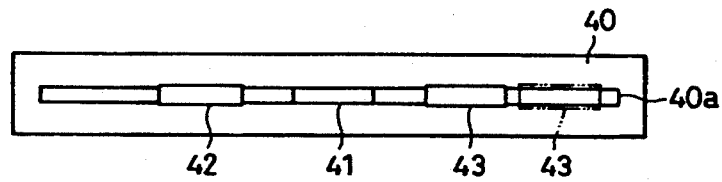

FIG. 12 shows a third embodiment of a focus detecting apparatus according to the present invention. In the third embodiment, the mirrors 21 and 22, and the separator lenses 32, 33, 34 and 35 are moved together in accordance with the change in the positions of the peripheral detecting zones 12 and 13, similar to the second embodiment discussed above. In the third embodiment, a single line sensor 40a is provided on the image reforming surface 40, as shown in FIG. 13. The bundles of rays are received by different areas of the line sensor 40a depending on the positions of the peripheral detecting zones.

When the peripheral detecting zones 12 and 13 are moved to the first position (i.e., inner position) next to the center detecting zone 11, the outputs of the areas 42 and 43 of the line sensor 40a, as indicated at solid lines in FIG. 13, are used as focus detecting data to detect the focus state. Similarly, when the peripheral detecting zones 12 and 13 are moved to the second position (i.e., outer position) away from the center detecting zone 11, the outputs of the areas 42' and 43' of the line sensor 40a, as indicated at phantom lines in FIG. 13, are used as focus detecting data to detect the focus state. The areas (i.e., pixel arrays) of the line sensor 40a to be used are identified, for example, by their address, so that the selection of the areas of the line sensor 40a to be used can be controlled, based on address data.

According to the third embodiment, it is not necessary to physically move the line sensor in accordance with the movement of the peripheral detecting zones in order to detect the focus state, unlike the second embodiment in which movement of the line sensors takes place in accordance with the movement of the peripheral detecting zones. Consequently, the focus detecting apparatus of the third embodiment is simpler than that of the second embodiment.

It goes without saying that in a single lens reflex camera having a focus detecting apparatus according to the present invention, not only are AF detecting zones corresponding to the focus detecting zones 11, 12 and 13, indicated in a view finder, but also the positions of the peripheral detecting zones 12 and 13.

As can be understood from the above discussion, according to the present invention, the image height(s) of an object (or objects) to be detected can be easily changed by the displacement of the detecting zones on a predetermined focal surface.

In addition to the foregoing, in the case that there are a plurality of detecting zones, according to the present invention, movement of the detecting zones in accordance with the focal length of the taking lens makes it possible to maintain detection of the same objects by the detecting zones before and after the zooming is completed.

We claim:

1. A focus detecting apparatus comprising:
   an image reforming optical system which splits a bundle of rays incident upon a detecting zone provided on a predetermined focal surface and reforms an image of an object, said focal surface being substantially conjugate with a focal plane of a taking lens;
   light receiving means for receiving said reformed image;
   detecting means for detecting a focus state of said taking lens in accordance with an output of said light receiving means; and,
   moving means for moving said detecting zone on said predetermined focal surface.

2. The focus detecting apparatus of claim 1, wherein said detecting zone comprises a center detecting zone and movable peripheral detecting zones.

3. The focus detecting apparatus of claim 2, wherein a lengthwise direction of said peripheral detecting zones is coincident with a sagittal direction of said taking lens.

4. The focus detecting apparatus of claim 3, wherein said peripheral detecting zones are normal to the lengthwise direction of said center detecting zone.

5. The focus detecting apparatus of claim 4, wherein said light receiving means includes a line sensor.

6. The focus detecting apparatus of claim 5, further comprising:
   deflecting means provided between said detecting zone and said line sensor for deflecting said bundles of rays transmitted through said center detecting zone and said peripheral detecting zones and making said bundles of rays incident upon said line sensor.

7. The focus detecting apparatus of claim 6, wherein said detecting zone moving means comprises a mechanism which moves said peripheral detecting zones and an auxiliary means for moving said deflecting means in accordance with movement of said peripheral detecting zones.

8. The focus detecting apparatus of claim 7, wherein said deflecting means comprises a first deflecting mirror which reflects said bundles of rays transmitted through said peripheral detecting zones and a second deflecting mirror which reflects said bundle of rays reflected by said first deflecting mirror towards said image reforming optical system.

9. The focus detecting apparatus of claim 8, wherein said detecting zone moving means moves said peripheral detecting zones and said first deflecting mirror together.

10. The focus detecting apparatus of claim 2, further comprising:
an optical path length correcting means for maintaining an optical path length between said detecting zone and said light receiving means constant, when said peripheral detecting zones are moved by said moving means.

11. The focus detecting apparatus of claim 2, wherein said detecting zone moving means moves said peripheral detecting zones, said image reforming optical system, and said light receiving means together.

12. The focus detecting apparatus of claim 2, wherein said detecting zone moving means moves said peripheral detecting zones and said image reforming optical system together.

13. The focus detecting apparatus of claim 12, wherein said light receiving means comprises a line sensor, and wherein an area at which said bundle of rays is made incident on said line sensor changes when said peripheral detecting zones and said image reforming optical system are moved by said moving means.

14. The focus detecting apparatus of claim 2, wherein said light receiving means comprises a line sensor, and wherein an area at which said bundle of rays is made incident on said line sensor changes when said peripheral detecting zones are moved by said moving means.

15. A focus detecting apparatus comprising:
a center detecting zone and peripheral detecting zones provided on a predetermined focal surface which is substantially conjugate with a focal plane of a taking lens, lengthwise directions of said peripheral zones being coincident with a sagittal direction of said taking lens;
an image reforming optical system which splits bundles of rays transmitted through said center detecting zone and said peripheral detecting zones and reforms an image;
linear light receiving means for receiving a reformed image;
detecting means for detecting a focus state of said taking lens in accordance with an output of said light receiving means; and,
deflecting means for deflecting said bundles of rays transmitted through said center detecting zone and said peripheral detecting zones in a manner such that said bundles of rays are made incident upon said light receiving means; said deflecting means comprising first deflecting means comprising a deflecting mirror which reflects said bundles of rays transmitted through said center detecting zone, and second deflecting means comprising first deflecting mirrors which reflect said bundles of rays transmitted through said peripheral detecting zones and second deflecting mirrors which reflect said bundles of rays reflected by said first deflecting mirrors towards said light receiving means; and detecting zone moving means for moving said peripheral detecting zones and said first deflecting mirrors towards and away from said center detecting zone.

16. The focus detecting apparatus of claim 15, further comprising:
optical path length correcting means for maintaining an optical path length between said peripheral detecting zones and said light receiving means constant when said peripheral detecting zones are moved by said detecting zone moving mean.

17. The focus detecting apparatus of claim 16, wherein a point at which said bundle of rays is made incident on said line sensor changes: when said peripheral detecting zones are moved by said detecting zone moving means.

18. A focus detecting apparatus comprising:
center detecting zone and peripheral detecting zones provided on a predetermined focal surface which is substantially conjugate with a focal plane of a taking lens;
detecting zone moving means for moving said peripheral detecting zones with respect to said center detecting zone;
image reforming optical system which splits bundles of rays transmitted through said center detecting zone and said peripheral detecting zones and reforms an image;
linear light receiving means for receiving said reformed image; and,
detecting means for detecting a focus state of said taking lens in accordance with an output of said light receiving means.

19. The focus detecting apparatus of claim 18, wherein a lengthwise direction of said peripheral detecting zones is coincident with a sagittal direction of said taking lens and perpendicular to said center detecting zone.

20. A focus detecting apparatus comprising:
a center detecting zone and peripheral detecting zones provided on a predetermined focal surface which is substantially conjugate with a focal plane of a photographing lens;
an image reforming optical system which splits bundles of rays transmitted through said center detecting zone and said peripheral detecting zones and reforms an image;
light receiving means for receiving said reformed image;
detecting means for detecting a focus state of said photographing lens in accordance with an output of said light receiving means;
first deflecting means for deflecting said bundles of rays transmitted through said center detecting zone;
second deflecting means for deflecting said bundles of rays transmitted through said peripheral detecting zones;
said first and second deflecting means deflecting said bundles of rays transmitted through said center detecting zone and through said peripheral detecting zones such that said bundles of rays are made incident upon said light receiving means;
detecting zone moving means for moving said peripheral detecting zones and said first deflecting means towards and away from said center detecting zone.

21. The focusing detecting apparatus of claim 20, said first deflecting means comprising a deflecting mirror which reflects said bundles of rays transmitted through said center detecting zone, said second deflecting means comprising first deflecting mirrors which reflect said bundles of rays transmitted through said peripheral detecting zones and second deflecting mirrors which reflect said bundles of rays reflected by said first deflecting mirrors towards said light receiving means, said detecting zone moving means moving said first deflecting mirrors towards and away from said center detecting zone.

22. The focus detecting apparatus of claim 20, further comprising optical path length correcting means for maintaining an optical path length between said peripheral detecting zones and said light receiving means constant when said peripheral detecting zones are moved by said detecting zone moving means.

23. The focus detecting apparatus of claim 20, wherein a point at which said bundles of rays are made incident on said light sensor changes when said peripheral detecting zones are moved by said deflecting zone moving means.

* * * * *

UNITED STATES PATENT AND TRADEMARK OFFICE
CERTIFICATE OF CORRECTION

PATENT NO. : 5,420,438
DATED : May 30, 1995
INVENTOR(S) : T. SENSUI et al.

It is certified that error appears in the above-indentified patent and that said Letters Patent is hereby corrected as shown below:

On the title page and column 1, line 3, in the title, at section [54], line 3, change "Zones" to --Zone--.

At column 10, line 14 (claim 17, line 3), change "changes:" to ---changes---.

Signed and Sealed this

Twenty-third Day of January, 1996

Attest:

BRUCE LEHMAN

Attesting Officer  Commissioner of Patents and Trademarks